US007226080B2

(12) United States Patent
Humphries (10) Patent No.: US 7,226,080 B2
(45) Date of Patent: Jun. 5, 2007

(54) ADJUSTABLE RECOVERY SPADE

(75) Inventor: David F. Humphries, Greencastle, PA (US)

(73) Assignee: Jerr-Dan Corporation, Greencastle, PA (US)

( * ) Notice: Subject to any disclaimer, the term of this patent is extended or adjusted under 35 U.S.C. 154(b) by 0 days.

(21) Appl. No.: 10/257,773

(22) PCT Filed: Apr. 23, 2001

(86) PCT No.: PCT/US01/13005

§ 371 (c)(1),
(2), (4) Date: Jun. 9, 2003

(87) PCT Pub. No.: WO01/81137

PCT Pub. Date: Nov. 1, 2001

(65) Prior Publication Data

US 2004/0004346 A1    Jan. 8, 2004

(51) Int. Cl.
*B60S 9/02* (2006.01)
(52) U.S. Cl. .................... 280/763.1; 280/475
(58) Field of Classification Search ............ 280/763.1, 280/764.1, 765.1, 475; 254/418, 419, 420; 248/188.8, 188.9, 352
See application file for complete search history.

(56) References Cited

U.S. PATENT DOCUMENTS

| 1,727,430 | A | * | 9/1929 | Gilkison | .................. 280/763.1 |
| 2,177,677 | A | * | 10/1939 | Staben | .................. 182/21 |
| 2,634,941 | A | * | 4/1953 | Eckert | ...................... 280/763.1 |
| 3,020,063 | A | | 2/1962 | Warren | |
| 3,106,410 | A | * | 10/1963 | Walter | .......................... 280/755 |
| 3,315,973 | A | * | 4/1967 | Marple | .......................... 280/656 |
| 3,355,136 | A | * | 11/1967 | Staples | ........................ 248/352 |
| 3,642,242 | A | | 2/1972 | Danekas | |
| 3,690,694 | A | * | 9/1972 | Herndon et al. | .......... 280/763.1 |
| 3,913,942 | A | | 10/1975 | MacKenzie et al. | |
| 3,944,259 | A | | 3/1976 | Miller | |
| 4,316,601 | A | * | 2/1982 | Osborne et al. | ............ 254/424 |
| 4,903,977 | A | | 2/1990 | Baxter | |
| 4,997,203 | A | * | 3/1991 | Jensen | ...................... 280/763.1 |
| 5,067,746 | A | | 11/1991 | Baker | |
| 5,387,071 | A | | 2/1995 | Pinkston | |
| 5,409,251 | A | * | 4/1995 | Thorndyke | .................. 280/475 |
| 5,431,443 | A | | 7/1995 | Skoff | |
| 5,662,451 | A | * | 9/1997 | Muzzi et al. | ................ 414/540 |

\* cited by examiner

*Primary Examiner*—Christopher P. Ellis
*Assistant Examiner*—Bridget Avery
(74) *Attorney, Agent, or Firm*—Foley & Lardner LLP (57) ABSTRACT

A recovery spade that is adjustably coupled to a rescue vehicle to thereby maximize traction during rescue operations. The recovery spade includes an anchor blade and a hollow support member. The anchor blade includes a plurality of holes for selective connection to the support member at differing heights via a pin. The anchor blade further includes an anchor portion with teeth at one end for engaging the ground to effect the traction and coupling holes at the other end for selective connection to the anchor blade at differing angles.

25 Claims, 11 Drawing Sheets

ADJUSTABLE RECOVERY SPADE

BACKGROUND OF THE INVENTION

The present invention relates to rescue and rescue vehicles and, more particularly, to a recovery spade for maintaining the vehicle in a stationary position during rescue and recovery operations.

During the course of normal activities, drivers often encounter hazards that often result in vehicular misfortunes. Such misfortunes often involve one or more vehicles being directed off a public and/or private road into a trench or furrow (i.e., a ditch). Once in the trench, the vehicle becomes trapped and is unable to escape on its own. Normally, a rescue vehicle must be provided to retrieve the trapped vehicle. Rescue vehicles are known by various other names, including "wrecker" rescue vehicle, towing vehicle, tow truck, etc.

Rescue vehicles are commonly fitted with a crane member (or boom) that includes a winch and associated cable. The cable is secured to the trapped vehicle and the winch is activated to pull the trapped vehicle out of the trench. Accordingly, the winch and associated cable define a longitudinal rescue line. Rescue vehicles require a substantial amount of tractive power in order to accomplish their task. Supporting stifflegs, or recovery spades, are commonly provided at the rear of the rescue vehicle to engage the ground and increase the tractive power of the rescue vehicle. In order to maximize tractive power, the rescue vehicle should be oriented such that the longitudinal rescue line is parallel to the damaged vehicle. There are times, however, when such alignment is not practical because, for example, the rear wheels of the rescue vehicle would be positioned on compromising surfaces. There are also times when the rescue vehicle should preferably be aligned with (or positioned on) the road.

Recovery spades must be oriented transversely (i.e., perpendicular) to the longitudinal rescue line in order to maximize traction of the rescue vehicle. In situations where it is not practical, or feasible, to align the rescue vehicle with the longitudinal rescue line, conventional recovery spades cannot be oriented transversely to the longitudinal rescue line. Consequently, the maximum tractive power realizable by the rescue vehicle cannot be achieved. Rescue vehicles are often aligned with the longitudinal rescue line regardless of the environmental conditions in order to circumvent this shortcoming. Such attempts, however, place the rescue vehicle in a situation where it can slide and suffer the same fate as the trapped vehicle.

Various arrangements have been proposed for improving the tractive power of rescue vehicles and the like. For example, U.S. Pat. No. 2,928,557 issued to Cline discloses a wrecker, or hoisting apparatus, that includes means for stabilizing and preventing side slip while a service cable is used to pull a disabled automobile back onto a highway.

U.S. Pat. No. 3,127,037 issued to Newman discloses an apparatus for towing road vehicles that includes a pair of sprag-ended rods capable of engaging the ground to restrain the apparatus against movement during towing activities.

U.S. Pat. No. 4,018,458 issued to Shumaker discloses a vehicle stabilizer that consists of a pair of telescoping members, one of which includes a ground engaging foot. The stabilizer includes latch means between the telescoping member and the foot for holding the foot in a number of rotated positions relative to the telescoping member.

U.S. Pat. No. 4,245,855 issued to Larson discloses a vehicle stabilizer that includes a hydraulic cylinder pivotably mounted on each side of the vehicle. The stabilizer includes an extension rod that causes a tension member to rotate the cylinder about its pivot.

U.S. Pat. No. 4,640,660 issued to Watson discloses a recovery and towing vehicle designed to transport a freighter aircraft. The towing vehicle includes a pair of spades mounted in slideways. The spades are capable of being moved to engage the ground.

U.S. Pat. No. 4,700,852 issued to Mjoberg discloses a recovery vehicle device that includes a pair of lowerable supporting stifflegs that are capable of engaging the ground.

U.S. Pat. No. 5,431,443 issued to Skoff discloses a supporting device for a rescue vehicle that includes two legs, each of which has a footing plate located near a lateral vehicle edge of the vehicle. The legs are capable of being swiveled from a transportation position to a supporting position.

Accordingly, there is a need for a recovery spade capable of maximizing tractive power of a rescue vehicle regardless of its orientation relative to a trapped vehicle. There also exists a need for a recovery spade that can be adjusted such that it is substantially transverse with a longitudinal rescue line, regardless of the orientation of the rescue vehicle.

SUMMARY OF THE INVENTION

An advantage of the present invention is a recovery spade that maximizes tractive power of a rescue vehicle.

Another advantage of the present invention is a recovery spade that can be adjusted such that tractive force on the rescue vehicle is improved regardless of it's orientation relative to a trapped vehicle.

These advantages are achieved by the present invention wherein a recovery spade that can be adjusted such that it is transverse to a longitudinal recovery line between the rescue vehicle and the trapped vehicle.

According to one aspect of the invention, a recovery spade comprises: a support member having a hollow interior; an anchor blade slidably coupled to the support member, and a locking arrangement for securing the anchor blade to the support member. The anchor blade includes a plurality of teeth for engaging a surface, and is configured for placement in one or more orientations relative to the support member. According to such an arrangement, the recovery spade is capable of providing maximum tractive power to a rescue vehicle during a recovery operation. Moreover, this is accomplished irrespective of the rescue vehicle's orientation relative to a trapped vehicle.

Additional advantages and novel features of the present invention will be set forth in part in the description which follows, and in part will become apparent to those skilled in the art upon examination of the following, or may be learned by practice of the present invention. The embodiments shown and described provide an illustration of the best mode contemplated for carrying out the present invention. The invention is capable of modifications in various obvious respects, all without departing from the spirit and scope thereof. Accordingly, the drawings and description are to be regarded as illustrative in nature, and not as restrictive. The advantages of the present invention may be realized and attained by means of the instrumentalities and combinations particularly pointed out in the appended claims.

DETAILED DESCRIPTION OF ILLUSTRATED EMBODIMENTS

The present invention enables configuration of rescue vehicles that are capable of performing rescue operations on trapped vehicles while being positioned in the most stable position available. Hence, the rescue vehicle does not need to be repositioned based on the location of the trapped vehicle. Rather, the rescue vehicle is positioned in the most suitable location available and the recovery spades are oriented such that maximum traction is generated during the recovery operation. FIGS. 1–5 illustrate various configurations of the combination of the recovery spade of the present invention with a rescue vehicle. It should be noted that although one recovery spade is shown coupled to the rescue vehicle, a plurality of recovery spades can be used. It is preferred that at least two be used (one on each side of the rescue vehicle).

Figure 1:
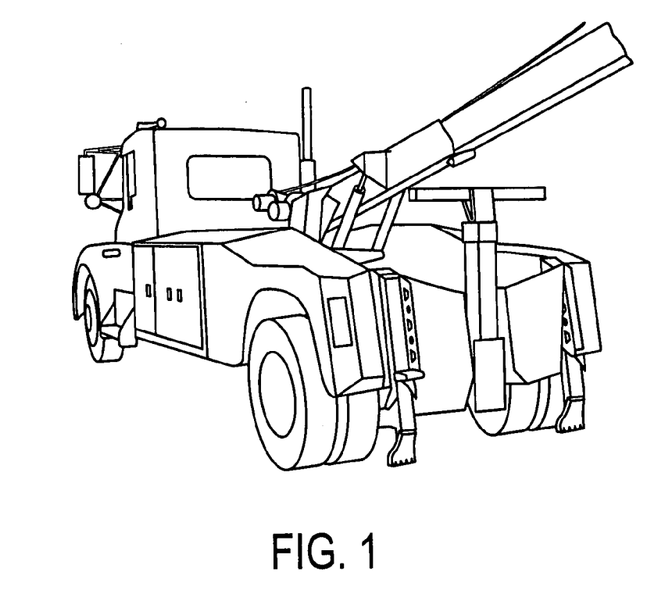
FIG. 1 is an environmental view illustrating a rescue vehicle that incorporates a recovery spade constructed in accordance with the present invention.
Figure 2:
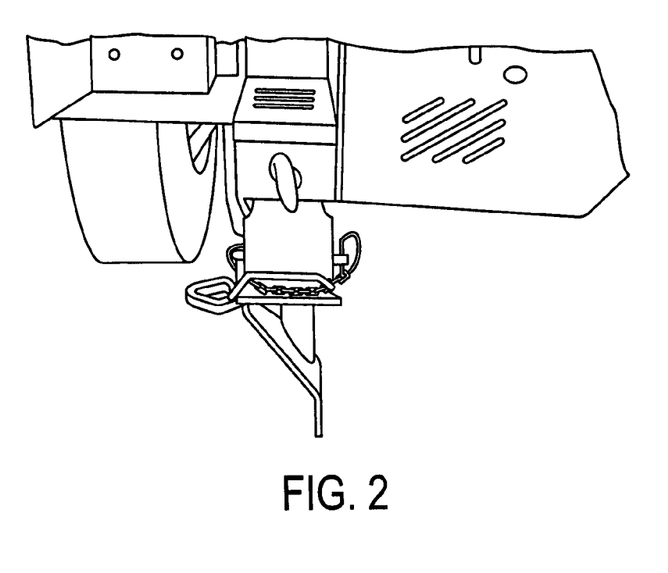
FIG. 2 is a side perspective view illustrating a recovery spade in a first orientation.
Figure 3:
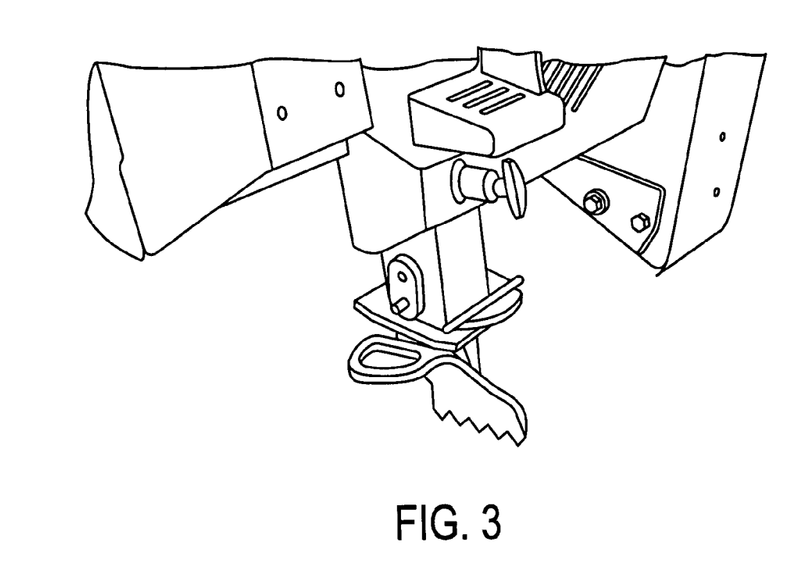
FIG. 3 is a front perspective view of the recovery spade illustrated in FIG. 2.
Figure 4:
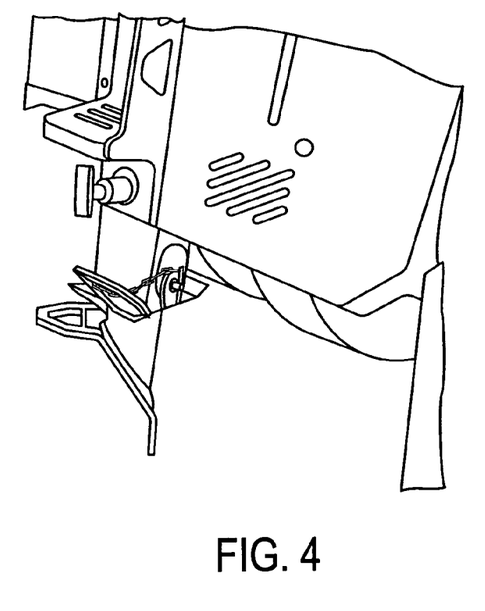
FIG. 4 is a side perspective view illustrating the recovery spade in a second orientation.
Figure 5:
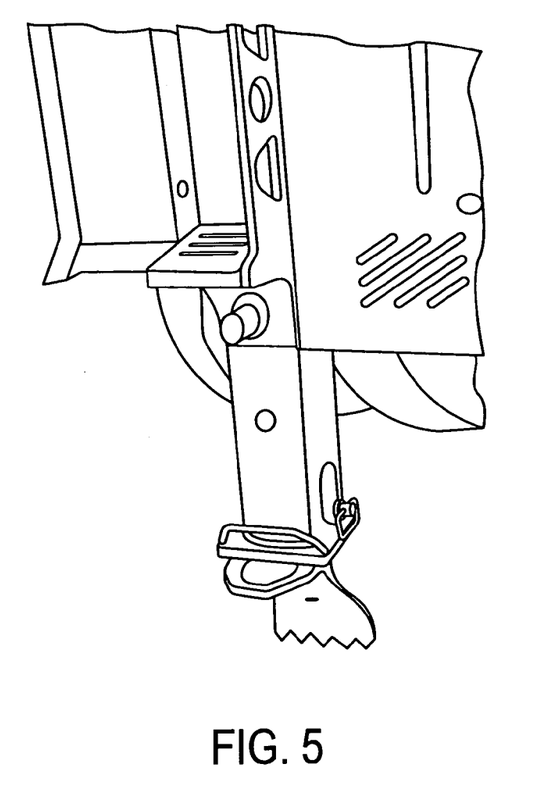
FIG. 5 is a side perspective view illustrating the recovery spade in a third orientation.
Figure 6A:
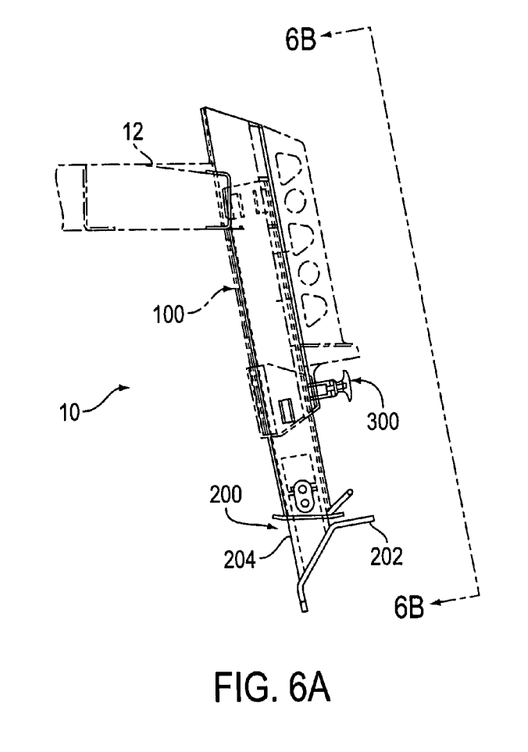
FIG. 6A is a side elevational view of the recovery spade.
Figure 6B:
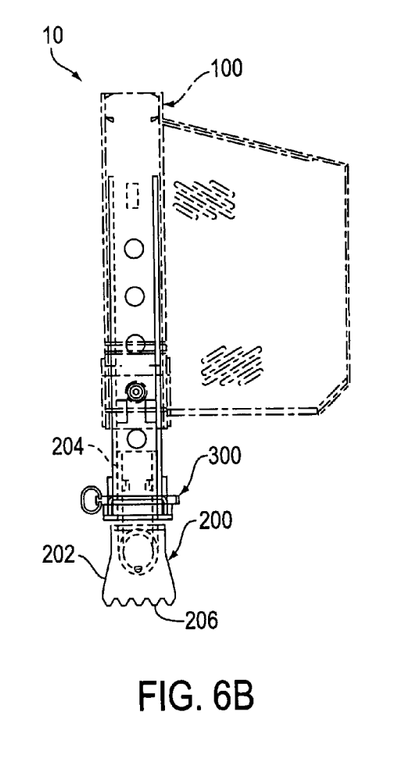
FIG. 6B is a sectional view taken along section A—A of FIG. 6A.

Turning to FIGS. 6a and 6b, one exemplary embodiment of the recovery spade 10 of the present invention will be discussed. FIG. 6a illustrates a side view of the recovery spade 10 with a suitable coupler structure 12 adapted to couple the recovery spade 10 to the rescue vehicle (not shown in FIG. 6a). The recovery spade 10 of the present invention includes generally a support member 100, an anchor blade 200, and a locking mechanism 300. The support member 100 is of rigid construction and has a hollow interior. The support member 100 is preferably constructed of high strength metals or metal alloys, such as iron and steel. Additionally, the metal can be treated using specialized processing, such as heat treatment or other methodologies, in order to further improve its properties. The support member 100 can also be formed from non-metallic materials such as composites and fiber reinforced composites. Although the support member 100 is illustrated as having a rectangular cross-section, it should be noted that various other configurations (i.e., circular, elliptic, etc.) could be used. The support member 100 is constructed such that it can be secured to the rear portion of a rescue vehicle via coupler structure 12. This can be accomplished using various fastening methods such as, for example, bolts, rivets, welding, etc.

The anchor blade 200 includes an anchor portion 202 and a guide portion 204. Similar to the support member 100, the anchor blade 200 is rigidly formed from high strength materials such as metals, metallic alloys, or composites. The guide portion 204 has an outer periphery that is similar to the inner periphery of the support member 100 in order to facilitate sliding movement within the support member 100. Alternatively, it is also possible to configure guide portion 204 so that it slides on the external surface of support member 100. In addition, the guide portion 204 of the anchor blade 200 can have a hollow interior in order to reduce weight. In most instances, however, the guide portion 204 can be of solid construction in order to maximize strength.

The anchor portion 202 has a generally flat configuration that defines a friction surface. The anchor portion 202 can include a tapered cross-section that allows the anchor blade 200 to penetrate a ground surface and generate a tractive (i.e., or frictional) force that prevents the rescue vehicle from moving during a rescue operation. More particularly, the anchor blade 200 is designed such that the friction surface is positionable transversely (i.e., perpendicularly) with respect to a longitudinal rescue line. As previously stated, the longitudinal rescue line can be defined as being substantially parallel to the cable interconnecting the winch of the rescue vehicle and the trapped vehicle. The closer to transverse the friction surface can be positioned relative to the longitudinal rescue line, the greater the tractive force generated. Hence, the rescue vehicle will be more stable while performing rescue operations.

As shown in FIG. 6b, the anchor portion 202 can include a plurality of teeth 206 formed at the end thereof. The teeth 206 function to further improve penetration of the anchor blade 200 into the ground during recovery operations. In addition, the teeth 206 can be designed to have various profiles such as conical, pyramidal, etc. Such configurations can improve the effectiveness of the recovery spade 10 in penetrating the ground to generate tractive (or frictional) force during rescue operations.

Figure 7A:
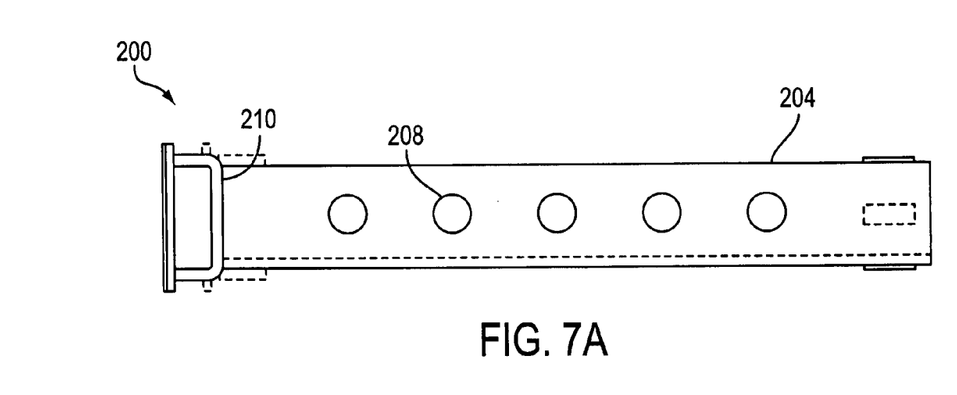
FIG. 7A is a top plan view of a support member of the recovery spade.
Figure 7B:
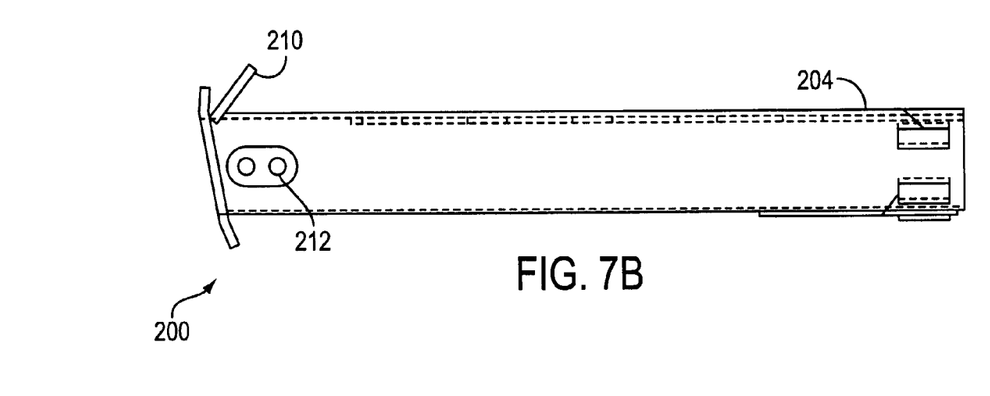
FIG. 7B is a front elevational view of the support member.
Figure 7C:
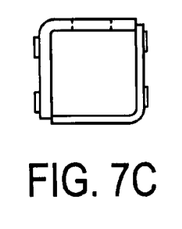
FIG. 7C is a side elevational view of the support member.

Turning to FIGS. 7a through 7c, the anchor blade 200 will be discussed in further detail. As shown in FIG. 7a, the guide portion 204 of the anchor blade 200 includes a plurality of holes 208 extending through a front face thereof. These holes 208 are configured to be in registry with a corresponding hole of the support member 100 so that a first locking pin (not shown in FIG. 7) can lock the anchor blade 200 to a desired height by being inserted through the hole of the support member 100 and a selected one of the plurality of holes 208. The guide portion 204 includes a handle 210 which is gripped by the operator to help lift or lower the guide portion 204 for sliding movement within the support member 100. As shown in FIG. 7b, the guide portion 204 further includes holes 212 on a side face thereof. These holes 212 are configured to be in registry with a corresponding hole of the anchor portion 202 so that a second locking pin (not shown in FIG. 7) can lock the anchor portion 202 to a desired angle by being inserted through a selected hole 212 and a respective hole of the anchor portion 202.

Figure 8A:
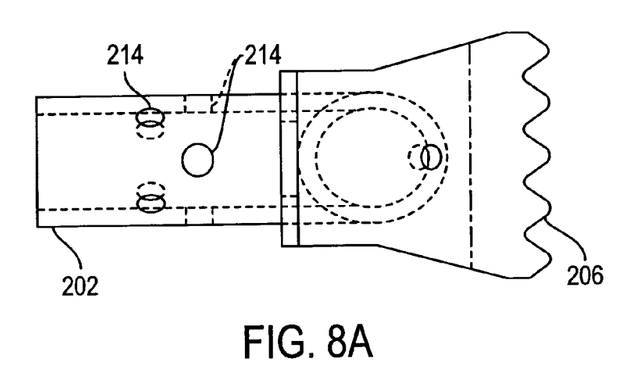
FIG. 8A is a top plan view of the anchor blade used in the recovery spade.
Figure 8B:
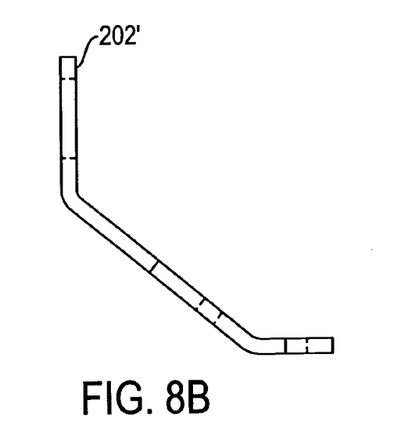
FIG. 8B is a side elevational view of the anchor blade.

Turning to FIGS. 8a and 8b, the anchor portion 202 will be discussed in further detail. As shown in FIG. 8a, the anchor portion 202 includes a plurality of holes 214 extending therethrough at two different heights and various positions around the periphery of the anchor portion 202. In the exemplary embodiment shown in FIG. 8a, the holes 214 are positioned at equally spaced 45 degree intervals with respect to each other. However, it should be appreciated that intervals of any desired angle (e.g., 30 degrees, etc.) can be used. In addition, the intervals between holes 214 need not be equally spaced and moreover, can be positioned at any number of respective heights. In sum, the holes 214 can be designed at any relative spacing in order to set forth desired positioning of the anchor portion 202. As shown in FIG. 8b, the anchor portion 202 includes a handle 202' whose functionality will be discussed below.

Figure 9:
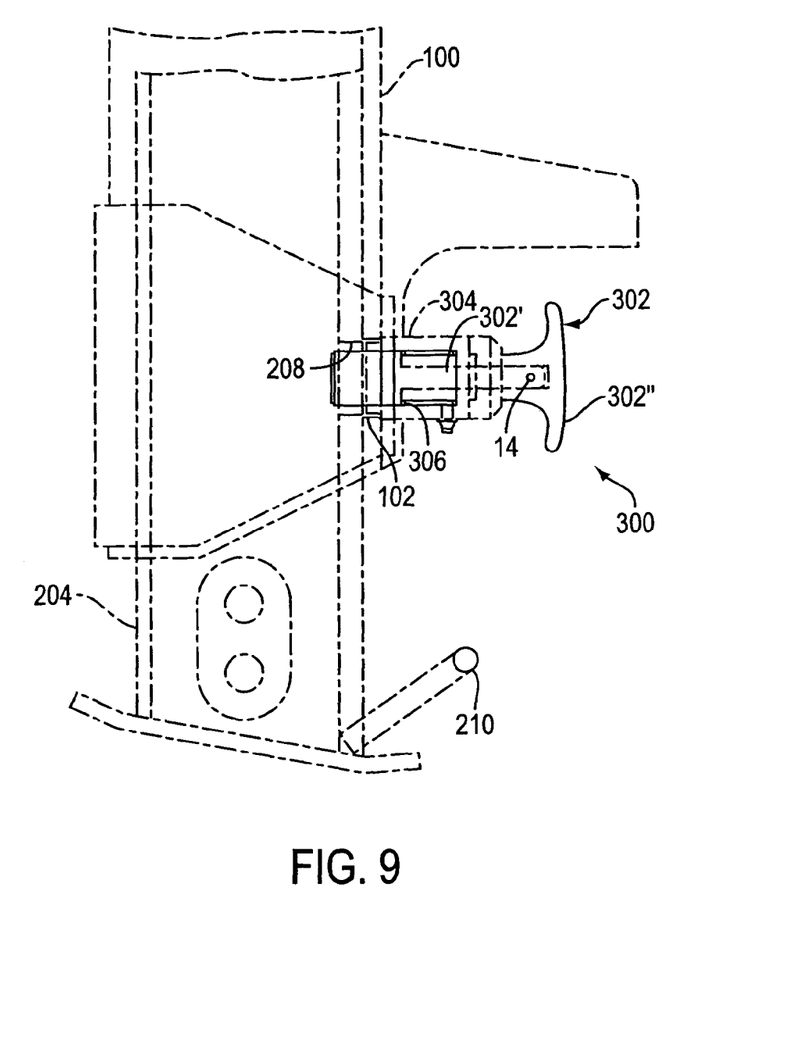
FIG. 9 is a side elevational view of a locking arrangement constructed in accordance with an embodiment of the present invention.

Turning to FIG. 9, the locking mechanism 300 will be discussed in further detail. The locking mechanism 300 includes a locking pin 302 slidably fitted within a lock housing 304. The locking pin 302 includes a plunger 302' which is coupled to a handle 302" (e.g., via rivet 14) configured to be gripped by the operator. Within lock housing 304 is a biasing spring 306. Biasing spring 306 engages a shoulder of the plunger 302' at one end and an inner surface of the lock housing 304 at another end, and is configured to bias locking pin 302 into a locking position (leftward as viewed in FIG. 9). As shown in FIG. 9, the plunger 302' extends through hole 102 of the support member 100 and the selected hole 208 of the guide portion 204 to thereby lock the anchor blade 200 to the support member 100 at a desired height.

When an operator desires to change the height of the anchor blade 200, he/she will grip the handle 210 with one hand and grip the handle 302" with the other hand, and thereafter pull the plunger 302' out of the respective holes 208, 102 against the bias of spring 306. The operator can then lift or lower guide portion 204 to a desired height by positioning another hole 208 of guide portion 204 in registry with hole 102, and then releasing handle 302" so that biasing spring 306 forces the plunger 302' back into a locking position. If a desired height is only one hole 208 apart from the currently used hole 208, after removing the plunger 302' from the locking position and moving the guide portion 204, the operator can let go of handle 302" and continue lifting or lowering the guide portion 204 until the biasing spring 306 automatically forces the plunger 302' back into the locking position.

Figure 10:
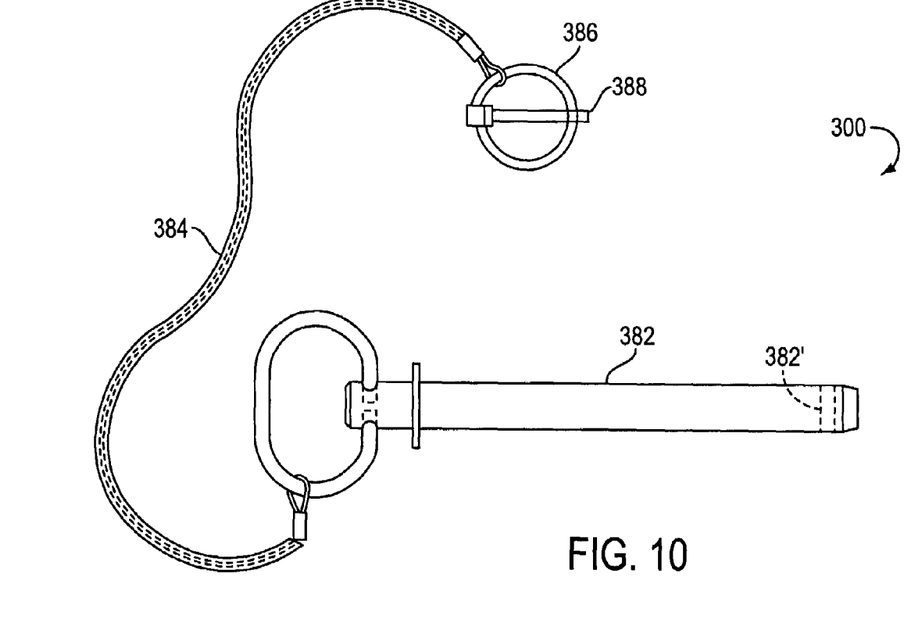
FIG. 10 is a side elevational view of a locking pin for use with the locking arrangement.
Figure 11A:
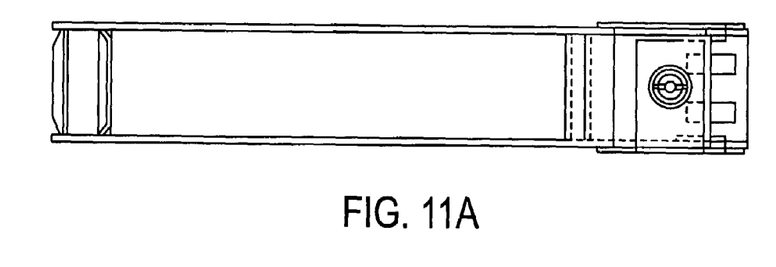
FIG. 11A is a front elevational view of a support member configured to be secured to a rescue vehicle.
Figure 11B:
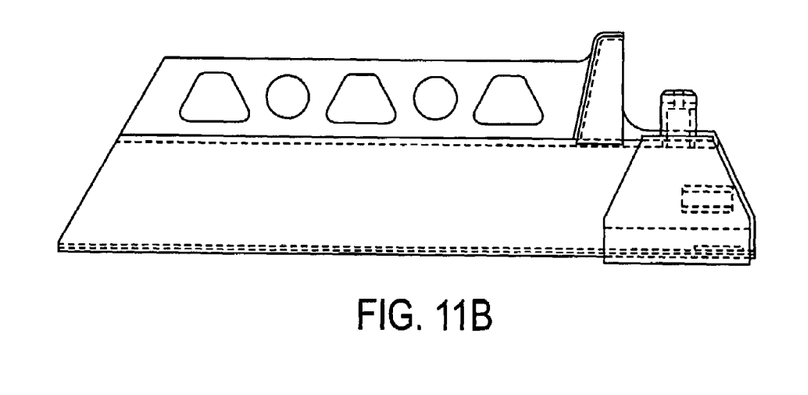
FIG. 11B is a side elevational view of the support member illustrated in FIG. 11A.
Figure 11C:
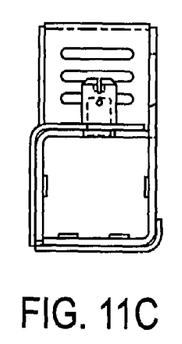
FIG. 11C is a bottom plan view of the support member illustrated in FIG. 11A.

With reference to FIGS. 6a, 6b, 8a, and 10, the manner in which the recovery spade 10 is adjusted to a desired angle will now be discussed. As shown in FIG. 10, the locking mechanism 300 further includes a pin 382, a linkage 384 (e.g., chain link; but suitable alternatives include, but not limited to, a wire, thread, etc.), a locking ring 386, and a rivet 388. FIGS. 6a and 6b illustrate the recovery spade 10 in the normal angle with respect to the rescue vehicle (see, for example, FIGS. 1 and 5). Once the anchor portion 202 is locked to the support member 100 at a desired height, the operator can then adjust the anchor portion 202 by rotating it relative to the guide portion 204.

In order to effect the adjustment, the operator must first remove pin 382, which extends through one of the selected holes 212 of guide portion 204 and the selected holes 214 of the anchor portion 202. Pin 382 extends through the respective holes and extends out on the opposite side of the anchor portion 202. There, pin 382 is inserted through locking ring 386, which meets pin 382 outside of guide portion 204 on the opposite side via linkage 384, so that rivet 388 (e.g., threaded bolt) can extend through hole 382' of pin 382; thereby locking pin 382 to guide portion 204 and anchor portion 202. In order to remove pin 382, the operator needs to simply unthread rivet 388 from hole 382' and pull pin 382 out. While doing so, the operator will be holding the handle 202' so that when the pin 382 is removed, the operator can rotate and/or lift/lower anchor portion 202 relative to guide portion 204 so that the desired holes 214 of the anchor portion 202 are in registry with the desired holes 212 of the guide portion 204. Thereafter, the operator re-inserts the pin 382 through the respective holes to lock anchor portion 202 to guide portion 204 in the desired orientation.

Accordingly, it is readily apparent that the anchor blade 202 of the present recovery spade 10 can be rotated and locked such that the friction face is oriented at varying heights and angular displacements. For example, consider a longitudinal rescue line that is coincident with a centerline of the rescue vehicle. Turning to FIGS. 1–5, which illustrate exemplary embodiments, the anchor blade 200 of the present invention can be advantageously rotated such that the friction face forms a 45 degree, 90 degree, 135 degree, or 180 degree angle with the longitudinal rescue line. Such an ability allows the rescue vehicle to be positioned at the most structurally stable location available to perform the rescue operation, while the anchor blade(s) 200 are rotated to a position that will provide maximum tractive force. Specifically, the winch cable is dispensed and attached to the trapped vehicle. Once attached, a longitudinal rescue line can be determined. The anchor blade(s) 200 are then rotated such that the friction face is as close to transverse (or perpendicular) as possible relative to the longitudinal rescue line. Accordingly, a maximum amount of tractive force can be generated by the rescue vehicle during the rescue operation without compromising stability of the rescue vehicle.

In order to maximize effectiveness of the recovery spade 10 of the present invention, the anchor blade 200 must be sufficiently inserted into the ground. According to one embodiment of the invention, the recovery spade 10 is secured to the rescue vehicle using an underlift assembly. During recovery operations, the underlift is lowered toward the ground. As this operation continues, the rear of the rescue vehicle is eventually lifted off the ground. The anchor blade 200 is then positioned in the appropriate orientation and lowered until contact is made with the ground. The locking pin is then inserted through the locking apertures of the support member 100 to secure the anchor blade 200. The underlift is raised in order to lower the rear of the rescue vehicle. As the rear of the rescue vehicle is lowered, the anchor blade 200 is simultaneously forced to penetrate the ground.

According to another embodiment of the invention, a hydraulic unit is provided to lower the anchor blade 200. This can be accomplished, for example, by attaching a hydraulically actuated cylinder to the underlift. The recovery spade 10 is secured to the underlift such that the anchor blade 200 can be operatively coupled to the moving end of the cylinder once appropriately oriented. The hydraulic cylinder is actuated to lower the anchor blade 200 and penetrate the ground until sufficient depth is achieved.

As may be apparent from the above description, the depth at which the anchor blade penetrates the ground greatly effects the stability of the rescue vehicle during the recovery operation. The surface characteristics of the terrain (i.e., soil, concrete, asphalt) will also effect penetration. For example, hard surfaces such as concrete or asphalt will not facilitate penetration by the anchor blade, while softer surfaces such as soil readily facilitate penetration. Accordingly, the rescue vehicle is preferably positioned on soft terrain during recovery operations so that the anchor blades can sufficiently penetrate the ground to provide maximum stability.

Only the preferred embodiments of the invention and but a few examples of its versatility are shown and described in the present disclosure. It is to be understood that the invention is capable of use in various other combinations and environments and is capable of changes or modifications within the scope of the inventive concept as expressed herein.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A recovery spade for a rescue vehicle having a winch and cable defining a longitudinal rescue line, the recovery spade comprising:
    a support member secured to the vehicle and having a longitudinal axis;
    an anchor blade coupled to the support member and comprising:
        a guide portion translatable relative to the support member and defining a first hole; and
        an anchor portion rotatable about an axis that is substantially parallel to the longitudinal axis, the anchor portion defining a second hole and a third hole configured to be in selective registry with the first hole, the third hole being angularly offset from the second hole around a periphery of the anchor portion; and
    a first locking mechanism for securing the anchor portion to the guide portion by engaging the first hole and one of the second hole and the third hole depending on a desired orientation of the anchor blade,
    wherein the anchor portion is rotatable about the axis that is substantially parallel with the longitudinal axis of the support member while engaging with the guide portion.

2. The recovery spade of claim 1, wherein the third hole is provided at a first height on the periphery of the anchor portion and the second hole is provided at a second height on the periphery of the anchor portion, the first height being different than the second height.

3. The recovery spade of claim 1, wherein the first locking mechanism includes pin configured to be inserted through the first hole of the guide portion and one of the second hole and the third hole in the anchor portion to lock the anchor portion to the guide portion at the desired orientation.

4. The recovery spade of claim 1, wherein the anchor portion includes a plurality of teeth adapted for engaging such a surface.

5. The recovery spade of claim 1, wherein the guide portion includes a first handle for lifting the guide portion relative to the support member and the anchor portion includes a second handle for rotating the anchor portion relative to the guide portion.

6. The recovery spade of claim 1, wherein the support member includes a hollow interior, the anchor blade disposed at least partially within the hollow interior for sliding therein.

7. The recovery spade of claim 2, wherein the anchor portion defines a plurality of holes at the first height and a plurality of holes at the second height, wherein the plurality of holes at the first height are angularly offset from the plurality holes at the second height, all of the plurality of holes being configured to be in selective registry with the first hole defined by the guide portion.

8. The recovery spade of claim 4, wherein the plurality of teeth are provided along a lower edge of a relatively flat friction surface that is selectively movable to a position that is substantially perpendicular to the longitudinal rescue line by rotating the anchor portion.

9. The recovery spade of claim 6, wherein the support member includes an opening extending through a face thereof and configured to receive a second locking mechanism, wherein the guide portion of the anchor blade includes a plurality of vertically-offset height adjustment openings configured to be in selective registry with the opening in the support member and receive the second locking mechanism.

10. The recovery spade of claim 7, wherein the plurality of holes at the first height and plurality of holes at the second height are positioned at equally spaced intervals around the periphery of the anchor portion relative to each other.

11. The recovery spade of claim 9, wherein the second locking mechanism is a plunger including a housing coupled to the support member and a spring located at least partially within the housing, the spring biasing the plunger toward the support member, wherein the plunger is adapted to be manually manipulated against the bias of the spring.

12. A recovery spade for stabilizing a vehicle utilizing a cable defining a longitudinal rescue line, the recovery spade comprising:
    a guide portion having a longitudinal axis; and
    an anchor portion supported at the guide portion and rotatable about an axis substantially parallel to the longitudinal axis of the guide portion while remaining supported at the guide portion, the anchor portion comprising a relatively flat friction surface having a plurality of teeth along a lower edge, the friction surface is configured to penetrate a ground surface for generating a tractive force,
    wherein the friction surface is configured to be selectively arranged in a desired orientation depending on the position of the longitudinal rescue line.

13. The recovery spade of claim 12, wherein the friction surface is configured to be selectively arranged in an orientation that is substantially traverse to the longitudinal rescue line.

14. The recovery spade of claim 12, wherein the anchor portion is configured for translational movement relative to the guide portion.

15. The recovery spade of claim 12, wherein the guide portion includes at least one hole extending through a face thereof, the anchor portion includes a plurality of holes positioned about a periphery of the anchor portion adapted to be positioned in registry with the at least one hole of the guide portion.

16. The recovery spade of claim 12, further comprising a locking mechanism for selectively securing the anchor portion relative to the guide portion when the friction surface is in the desired orientation.

17. The recovery spade of claim 14, wherein the guide portion is configured for translational movement relative to a support member coupled to the vehicle.

18. The recovery spade of claim 15, wherein the plurality of holes of the anchor portion are angularly offset from each other around the periphery of the anchor portion.

19. The recovery spade of claim 18, wherein the guide portion includes a hollow interior, the anchor portion disposed at least partially within the hollow interior for rotational and translational movement therein.

20. The recovery spade of claim 18, wherein the plurality of holes of the anchor portion are provided at more than one height about the periphery of the anchor portion.

21. A recovery spade for stabilizing a vehicle utilizing a cable defining a longitudinal rescue line, the recovery spade comprising:
- a guide portion having a longitudinal axis and defining a first hole; and
- an anchor portion supported at the guide portion and rotatable about an axis substantially parallel to the longitudinal axis of the guide portion, the anchor portion including a friction surface configured to penetrate a ground surface for generating a tractive force, the anchor portion defining a second hole and a third hole configured to be in selective registry with the first hole, the third hole being angularly offset from the second hole around the periphery of the anchor portion, wherein the friction surface is moveable to a desired orientation by rotating the anchor portion relative to the guide portion and aligning one of the second hole and the third hole with the first hole.

22. The recovery spade of claim 21, wherein the third hole is provided at a first height and the second hole is provided at a second height, the first height being different than the second height.

23. The recovery spade of claim 22, wherein the third hole is angularly offset from the second hole between around 30 degrees and around 45 degrees.

24. The recovery spade of claim 22, wherein the anchor portion defines a plurality of holes at the first height and a plurality of holes at the second height.

25. The recovery spade of claim 21, further comprising a first handle coupled to the guide portion for lifting the guide portion relative to the vehicle and a second handle coupled to the anchor portion for rotating the anchor portion relative to the guide portion.

* * * * *

UNITED STATES PATENT AND TRADEMARK OFFICE
CERTIFICATE OF CORRECTION

PATENT NO. : 7,226,080 B2  
APPLICATION NO. : 10/257773  
DATED : June 5, 2007  
INVENTOR(S) : David F. Humphries Page 1 of 1

It is certified that error appears in the above-identified patent and that said Letters Patent is hereby corrected as shown below:

Column 7:
Line 52, before "pin configured" insert --a--.

Signed and Sealed this

Eighteenth Day of December, 2007

JON W. DUDAS  
*Director of the United States Patent and Trademark Office*